United States Patent [19]

Goettel

[11] Patent Number: 5,711,206
[45] Date of Patent: Jan. 27, 1998

[54] PISTON AND CYLINDER ASSEMBLY FOR MINIMIZING WATER BLOW-BY IN AN AIR COMPRESSOR

[75] Inventor: Walter E. Goettel, Monongahela, Pa.

[73] Assignee: Westinghouse Air Brake Company, Wilmerding, Pa.

[21] Appl. No.: 660,627

[22] Filed: Jun. 6, 1996

[51] Int. Cl.⁶ ........................... F16J 1/04
[52] U.S. Cl. .................. 92/208; 92/168; 277/165; 277/205
[58] Field of Search ................ 277/165, 205; 92/168, 208, 192

[56] References Cited

U.S. PATENT DOCUMENTS

| | | | |
|---|---|---|---|
| 3,806,137 | 4/1974 | Prasse et al. | 277/205 |
| 3,917,290 | 11/1975 | Geoffrey | 277/193 |
| 4,102,608 | 7/1978 | Balkau et al. | 277/205 |
| 4,109,924 | 8/1978 | Stucke | 277/165 |
| 4,432,925 | 2/1984 | Holtzberg et al. | 277/216 |
| 4,629,200 | 12/1986 | Ruddy | 277/216 |
| 5,474,307 | 12/1995 | DeBiasse et al. | 277/165 |

OTHER PUBLICATIONS

*Encyclopedia of Plastics*, pp. 173–174 Dated Dec. 1989.

Primary Examiner—Thomas E. Denion
Attorney, Agent, or Firm—John B. Sotak

[57] ABSTRACT

This invention relates to a piston arrangement for minimizing water blow-by in a cylinder bore, comprising a set of metallic compression and oil rings, and a resin-filled O-ring for reducing water blow-by in the cylinder bore until the set of metallic compression and oil rings are properly seated in the cylinder bore.

9 Claims, 2 Drawing Sheets

PISTON AND CYLINDER ASSEMBLY FOR MINIMIZING WATER BLOW-BY IN AN AIR COMPRESSOR

FIELD OF THE INVENTION

This invention relates to an arrangement for curtailing the entrance of water into the crankcase of an air compressor, and more particularly, to a piston and cylinder assembly for minimizing the mount of contaminates that is blown-by the compression and oil rings of an air compressor.

BACKGROUND OF THE INVENTION

It has been found that when the 3CD type of air compressor manufactured by the Westinghouse Air Brake Company is mounted in certain locations on railroad locomotives manufactured by the General Electric Company a contamination problem occurs with the crankcase lubricating oil. In the General Electric Dash 8 and Dash 9/AC locomotives, the inlet air filters are allowed to permit excess water into the air compressors during wet and raining periods. During these high humid conditions, moisture and water is drawn through the inlet air filters and is pulled into the compression chambers by the pistons and cylinders of the air compressor. Once the water enters the compression chamber, the pressure differential which is created across the compression and oil piston rings during the compression stroke will force the entrained water past any gap that exists between the piston-ring-cylinder interfaces. As the water is forced past the compression and oil rings, the lubricating oil in the crankcase is washed from the piston and cylinder assembly so that internal corrosion begins to occur in the air compressor. That is, once the water works its way beyond the unseated compression and oil rings it drops inside of the crankcase where it combines with and contaminates the lubricating oil. The corrosive action of the water causes accelerated wear on the moving components which can result in premature failure of the air compressor. Further, the accumulated water can break down the lubricity of the lubricating oil which can also lead to accelerated wear and possible failure of components when the water content becomes too great. Thus, it would be highly beneficial to reduce or minimize the entry of water into the crankcase of an air compressor.

OBJECTS AND SUMMARY OF THE INVENTION

Therefore, it is an object of this invention to provide a new and improved arrangement for minimizing water blow-by by the compression and oil piston rings of an air compressor.

Another object of this invention is to provide a watertight seal around the periphery of a piston to eliminate water migration down the piston and cylinder past the iron compression and oil rings of an air compressor.

A further object of this invention is to provide a composite sealing O-ring above the compression and oil rings on the piston to prevent the leakage of water down the cylinder into the crankcase of an air compressor.

Yet another object of this invention is to provide a continuous resin-filled ring into an annular groove located near the top of a piston to reduce water from being blown-by the piston rings to prevent the contamination of the lubricating oil in an air compressor.

Yet a further object of this invention is to provide unique water sealing arrangement for an air compressor in which an outer plastic O-ring and an inner elastic O-ring are adapted to initially prevent the entrance of water into a crankcase of an air compressor until the compression and oil piston rings become intimately seated against the cylindrical wall of the cylinder.

Still another object of this invention is to provide a piston for minimizing blow-by in a cylindrical bore comprising, a set of metallic compression and oil rings, a continuous resin-filled ring for reducing water blow-by in the cylinder bore until the set of metallic compression and oil rings are properly seated in the cylinder bore.

Still a further object of this invention is to provide a piston and cylinder assembly for preventing water blow-by into the crankcase of an air compressor comprising, a set of metallic compression and oil rings disposed in respective annular grooves formed in the piston, and an elastic O-ring and a plastic filled O-ring located in another annular groove formed in the piston to prevent initial water blow-by into the crankcase of the air compressor until the metallic compression and oil rings are properly seated to prevent subsequent blow-by into the crankcase of the air compressor.

An additional object of this invention is to provide an improved sealing arrangement for preventing water contamination of the lubricating oil of an air compressor which is simple in design, durable in use, efficient in operation, reliable in service, and economical in construction.

DESCRIPTION OF THE DRAWINGS

The above objects and other attendant features and advantges will become more readily appreciated as the subject invention becomes better understood by reference to the following detailed description when considered in conjunction with the accompanying drawings, wherein.

DETAILED DESCRIPTION OF THE INVENTION

Figure 1:
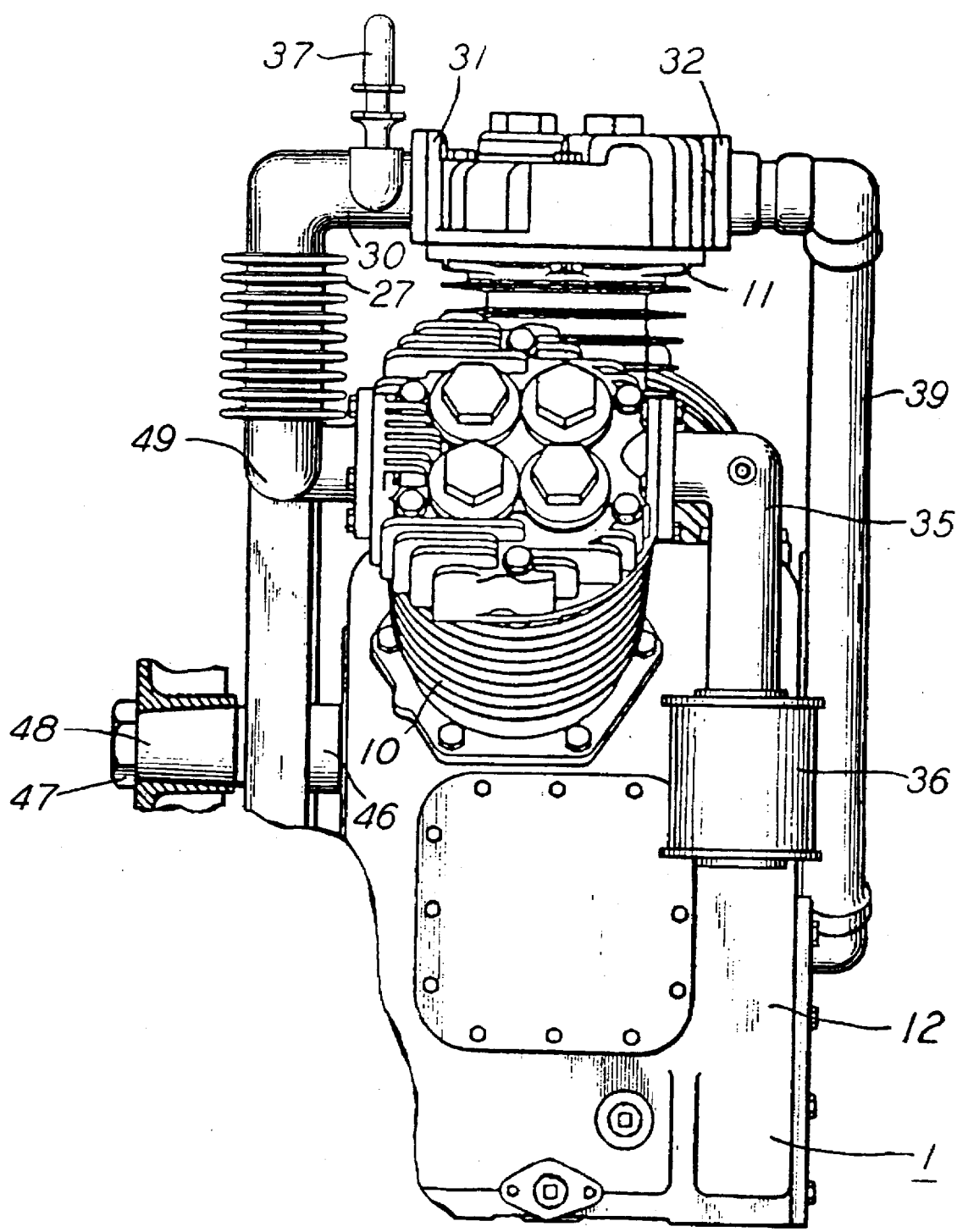
FIG. 1 is a side elevation view of a WABCO 3CD type of air compressor in which the protective cover, screen, and shroud have been omitted for the purpose of clarity.

Referring now to the drawings and in particular to FIG. 1, there is shown a 3CD type of air compressor 1 which is manufactured by the Westinghouse Air Brake Company of Wilmerding, Pa., and sold to locomotive builders. However, in some instances, the 3CD air compressors are mounted in locations which expose the inlet air filters to adverse, inclement or stormy weather conditions, such as, rain, snow and other high-humidity conditions. Thus, water is capable of being pulled into the inlet air filters, and then the water is passed into the compression chamber of the air compressor. In the past, the water drawn in the compression chamber was pushed by the iron compression and oil rings into the crankcase to dilute the lubricating oil. It has been established that the condemning level of the lubricating oil occurs when approximately two percent (2%) water mixes with the oil. It has been empirically determined that the sampled oils in new air compressors failed to meet the 2% condemning level at the early stages of their installation on railroad locomotives. It is a federal regulation that all railroad locomotives undergo safety inspections every ninety (90) days so that the lubricating oil of the air compressors be routinely monitored by the Maintenance personnel at these inspection periods. An interesting fact received from one prominent locomotive builder of oil sample reports is that failures progressively decrease with the age of the air compressor. In the past, it has been found that most oil failures occur up until approximately two hundred (200) days after the initial installation of the air compressors are mounted on the railroad locomotives. After that, the water blow-by problem dramatically decreases.

As shown in FIG. 1, the air compressor 1 is a multi-cylinder, two stage, air-cooled compressor having one of two low pressure cylinders 10 and a high pressure cylinder 11, each of which is provided with air cooling fins. It will be noted that the low and high pressure cylinders are mounted on and are supported on the compressor body which includes a lower crankcase 12 which contains the lubricating oil for the air compressor 1.

Figure 2:
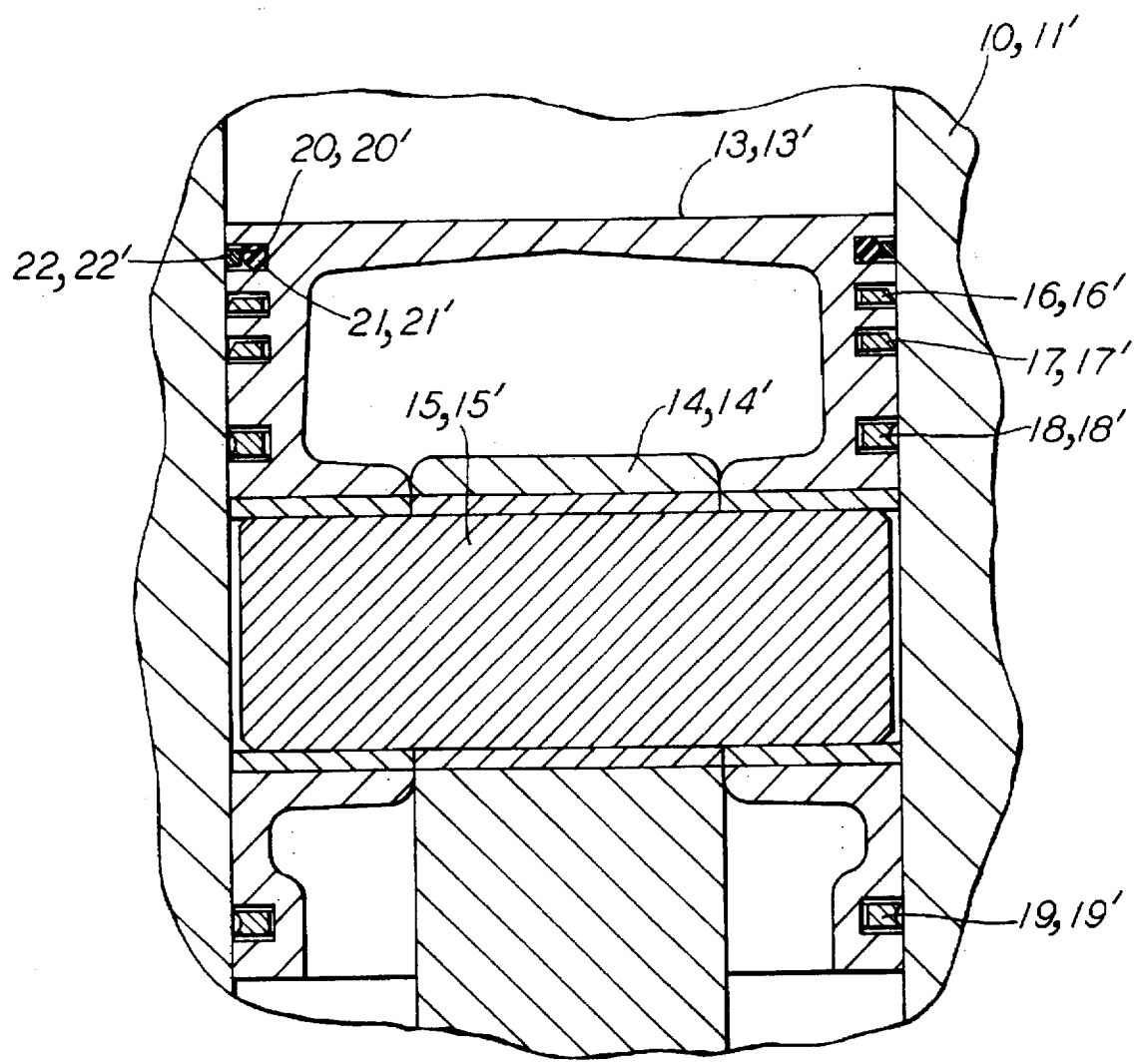
FIG. 2 is a broken away cross-sectional view of a piston and cylinder portion of the air compressor of FIG. 1 of the present invention.

As shown in FIG. 2, the low pressure cylinder 10 and the high pressure cylinder 11 each contain a piston 13,13' which is reciprocated by a connecting rod 14,14' which is attached to the piston 13,13' by a wrist pin 15,15'. The connecting rod 14,14' is driven by a rotary crankcase shaft 46 as noted in FIG. 1. The one end (not depicted) of the crankshaft 46 is coupled to and driven by a suitable rotatable prime mover, such as, an electric motor or diesel engine, while the other end of the crankshaft 46 is keyed and threadedly attached by a locknut 47 to the hub 48 of a rotary cooling fan (not shown). It will be noted that the inlet of the low pressure cylinder 10 is connected by conduit 35 to an air intake filter 36. The outlet 49 of the low pressure cylinder 10 is connected to an inlet of an aluminum intercooler (not characterized) by the finned riser pipe 27. The outlet of the aluminum intercooler is connected to a pipe fitting 30 which carries a safety valve 37. The safety valve 37 provides a means of warning personnel of excess pressure buildup. The outlet of the pipe fitting 30 is connected to the inlet 31 of the high pressure cylinder 11. The outlet 32 of the high pressure 11 is connected by suitable fittings and conduits to form piping 39 which, in turn, is connected to an aluminum aftercooler (not characterized).

Returning now to FIG. 2, it will be seen that the low and high pressure cylinders 10,11 each includes a piston 13,13', respectively. It will be appreciated that each respective piston 13,13' is moved by a piston rod 14,14' which is connected thereto by a respective wrist pin 15,15'. Further, it will be noted that each piston 13,13' is provided a plurality of conventional annular grooves for accommodating a set of upper compression rings 16,16', 17,17' and a set of lower oil rings 18,18', 19,19'. The compression and oil rings are springy split metal rings for sealing the gap between the outer periphery of the piston and the inner cylinder wall. In viewing FIG. 2, it will be seen that the outer peripheral edges of the iron compression rings 16,16', 17,17' are tapered to form a somewhat sharp lower edge which contacts the bore of the cylinder 10,11. Also, in viewing FIG. 2, it will be noted outer peripheral edges of the iron oil rings 18,18', 19,19' are concaved to form two outer ridges which contact the bore of the cylinder 10,11.

Figure 3:
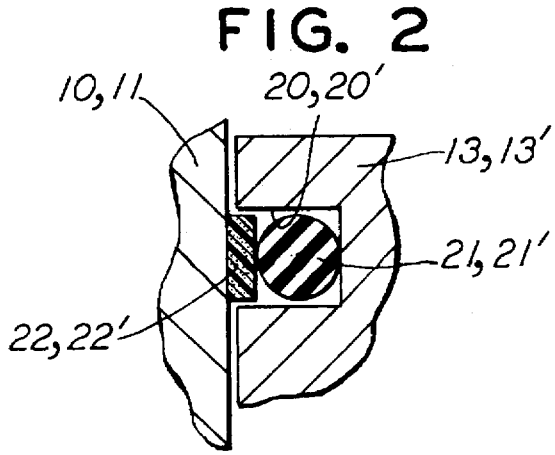
FIG. 3 is an enlarged cross-sectional view of the piston and cylinder including the water sealing O-rings located in the annular groove formed near the top of the reciprocating piston in accordance with the present invention.

In viewing FIGS. 2 and 3, it will be observed that the piston 13,13' includes another annular groove 20,20' formed near the top of the piston. As shown, the annular groove 20,20' accommodates a pair of flexible O-rings 21,21' and 22,22'. The inner O-ring 21,21' is an elastic or elastomeric back-up piston ring having a circular cross-section, while the outer O-ring 22,22' is a plastic or teflon filled piston ring having a rectangular cross-section. The inner elastic back-up O-ring 21,21' not only substantially fills up the area of the annular groove, but also provides a seal between the surfaces of the groove and the O-ring 22,22'. The elastic back-up O-ring 21,21' also provides an outward pressure which forces the O-ring 22,22' against the cylinder bore. It will be noted that the outer surface of the plastic filled piston ring 22,22' makes intimate contact with the cylindrical surface of the bore of the cylinder 10,11 so that the amount of blow-by is dramatically reduced. Thus, the reduction of blow-by mitigates the water contamination of the lubricating oil in the crankcase during the initial or early operation of new or rebuilt air compressors. This initial water blow-by reduction is highly beneficial until the iron compression and oil rings have had sufficient time to become properly seated in the cylinder bore at which time they can also act as a suitable water barrier.

In n comparative test between a standard air compressor with only iron compression and oil rings and a modified air compressor with the additional sealing O-rings, the following results have been noted. Each compressor is provided with a flowmeter to monitor the level of piston ring blow-by. Each flowmeter measures amount of air that is discharged from the crankcase breather of each compressor. The breather is the only vent from the compressor crankcase to the ambient. The blow-by was monitored with each compressor running at a 1,000 rpm and operating against a 140 psig system pressure. The amount of blow-by by the standard air compressor was 23.2 liters per minute, while the amount of blow-by by the modified air compressor was 2.3 liters per minute. Thus, the modified air compressor with the Teflon-filled O-rings and the elastomeric back-up O-rings reduces the air blow-by by a factor of 10 to 1. Accordingly, the decrease of water seepage into the crankcase materially reduces corrosion of the internal components of the air compressor and also effectively reduces the number of costly oil changes that are required due to contamination.

Thus, the present invention has been described in such full, clear, concise, and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that various alterations and changes may be made by those skilled in the art without departing from the spirit and scope of the subject invention. For example, the material and cross-section of the plastic O-ring and the back-up O-ring may be changed. At the present time the plastic O-ring 22,22' has a bronze filler, however, it is apparent that other suitable fillers may be used with, or in place of, bronze.

Therefore, it will be appreciated that certain modifications, ramifications, and equivalents will be readily apparent to persons skilled in the art and, accordingly, it is understood that the present invention should not be limited to the exact embodiment shown and described, but should be accorded the full scope and protection of the appended claims.

I claim:

1. A piston and cylinder assembly for preventing water blow-by into the crankcase of an air compressor comprising, a set of metallic compression and oil rings disposed in respective annular grooves formed in the piston, and an elastic O-ring and a plastic filled O-ring which includes a bronze filler being located in another annular groove formed in the piston to prevent initial water blow-by into the crankcase of the air compressor until the metallic compression and oil rings are properly seated in the cylinder bore to prevent subsequent water blow-by Into the crankcase of the air compressor.

2. The piston and cylinder assembly for preventing water blow-by into the crankcase of an air compressor as defined in claim 1, wherein said another annular groove is formed near the top of the piston.

3. The piston and cylinder assembly for preventing water blow-by into the crankcase of an air compressor as defined in claim 1, wherein said set of spring compression rings and the respective annular grooves are situated below said elastic O-ring and said plastic filled O-ring located in the another annular groove formed in the piston.

4. The piston and cylinder assembly for preventing water blow-by into the crankcase of an air compressor as defined in claim 1, wherein said set of spring oil rings and the respective annular groove are situated below said set of spring compression rings and the respective annular grooves formed in the piston.

5. The piston and cylinder assembly for preventing water blow-by into the crankcase of an air compressor as defined in claim 1, wherein the air compressor is a multi-cylinder, two-stage air compressor.

6. The piston and cylinder assembly for preventing water blow-by into the crankcase of an air compressor as defined in claim 1, wherein the air compressor includes a pair of low pressure cylinders and a high pressure cylinder.

7. The piston and cylinder assembly for preventing water blow-by into the crankcase of an air compressor as defined in claim 1, wherein said plastic filled O-ring has a rectangular cross-section.

8. The piston and cylinder assembly for preventing water blow-by into the crankcase of an air compressor as defined in claim 1, wherein said elastic O-ring has a circular cross-section.

9. The piston and cylinder assembly for preventing water blow-by into the crankcase of an air compressor as defined in claim 1, wherein said elastic O-ring urges said plastic filled O-ring against the inner wall of the cylinder bore.

* * * * *